United States Patent
Suzuki

(10) Patent No.: US 9,741,214 B2
(45) Date of Patent: Aug. 22, 2017

(54) INDICATION APPARATUS

(71) Applicant: YAZAKI CORPORATION, Tokyo (JP)

(72) Inventor: Hiroyuki Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 247 days.

(21) Appl. No.: 14/458,912

(22) Filed: Aug. 13, 2014

(65) Prior Publication Data

US 2014/0347191 A1 Nov. 27, 2014

Related U.S. Application Data

(63) Continuation of application No. PCT/JP2013/058462, filed on Mar. 15, 2013.

(30) Foreign Application Priority Data

Mar. 23, 2012 (JP) ................................. 2012-067274

(51) Int. Cl.
*G08B 5/00* (2006.01)
*G08B 5/36* (2006.01)
(Continued)

(52) U.S. Cl.
CPC ................ *G08B 5/36* (2013.01); *B60K 35/00* (2013.01); *G01P 1/08* (2013.01); *G04B 19/30* (2013.01);
(Continued)

(58) Field of Classification Search
CPC ....... B60K 35/00; B60K 2350/00; G08B 5/36
See application file for complete search history.

(56) References Cited

U.S. PATENT DOCUMENTS 3,965,668 A * 6/1976 Tomokazu ............. G04C 17/00
368/227
4,104,652 A * 8/1978 Hosoe .................... G03B 13/20
396/112
(Continued)

FOREIGN PATENT DOCUMENTS

CN 2932542 Y 8/2007
CN 201477837 U 5/2010
(Continued)

OTHER PUBLICATIONS

Japanese Office Action for the related Japanese Patent Application No. 2012-067274 dated Apr. 5, 2016.
(Continued)

*Primary Examiner* — Joseph Feild
*Assistant Examiner* — Rufus Point
(74) *Attorney, Agent, or Firm* — Kenealy Vaidya LLP

(57) ABSTRACT

An indication apparatus includes a square tub-shaped housing having at least one transparent side surface formed of a transparent member, an indication panel that is disposed on the transparent side surface and includes one or more indicator designs, a wiring board that includes one or more light sources corresponding to the one or more indicator designs and an electric circuit for turning the one or more light sources on/off, wherein the wiring board is inserted and received in the housing through an opening of a tub end of the housing, and a sponge light-shielding wall that is adhered on a surface of the wiring board for surrounding at least a portion of outer circumferential sides of at least one target light source of the one or more light sources.

7 Claims, 2 Drawing Sheets

(51) Int. Cl.
*B60K 35/00* (2006.01)
*G01P 1/08* (2006.01)
*G04B 19/30* (2006.01)

(52) U.S. Cl.
CPC .... *B60K 2350/00* (2013.01); *B60K 2350/203* (2013.01); *B60K 2350/2039* (2013.01); *B60K 2350/2073* (2013.01); *B60Y 2304/07* (2013.01)

(56) References Cited

U.S. PATENT DOCUMENTS

| | | | | |
|---|---|---|---|---|
| 4,271,408 A * | 6/1981 | Teshima | | G08G 1/095 340/815.45 |
| 4,732,657 A * | 3/1988 | November | | G01N 27/44704 204/618 |
| 4,813,642 A * | 3/1989 | Matsui | | H05K 3/301 174/138 G |
| 4,868,541 A * | 9/1989 | Sullivan | | B60Q 1/503 116/137 A |
| 4,915,341 A * | 4/1990 | Takahashi | | G09F 9/00 174/138 G |
| 5,374,876 A * | 12/1994 | Horibata | | G08B 5/006 315/178 |
| 5,533,286 A * | 7/1996 | Fallon | | G09F 13/26 362/812 |
| 5,598,543 A * | 1/1997 | Notarianni | | G06F 1/1632 370/473 |
| 5,702,308 A * | 12/1997 | Alexander, Jr. | | A63D 5/04 473/116 |
| 5,876,226 A * | 3/1999 | Tsukakoshi | | H01R 13/62927 439/157 |
| 6,060,838 A * | 5/2000 | Cantoni | | G09F 13/22 315/156 |
| 6,161,951 A * | 12/2000 | Yoneyama | | B60Q 1/007 362/265 |
| 7,462,871 B2 * | 12/2008 | Han | | H01L 25/167 257/81 |
| 8,728,712 B2 * | 5/2014 | Yabuki | | C08F 2/44 430/311 |
| 8,766,388 B2 * | 7/2014 | Ikeda | | G02B 13/006 257/432 |
| 9,007,520 B2 * | 4/2015 | Azuma | | G03B 3/10 348/208.4 |
| 9,316,248 B2 * | 4/2016 | Appl | | F16B 43/00 |
| 2002/0041016 A1 * | 4/2002 | Hyodo | | H01L 23/055 257/678 |
| 2002/0134564 A1 * | 9/2002 | Bauernschmidt | | H05K 9/0024 174/359 |
| 2004/0055193 A1 * | 3/2004 | Broelemann | | G09F 13/04 40/564 |
| 2006/0207134 A1 * | 9/2006 | Harry | | G09F 19/12 40/453 |
| 2007/0029564 A1 * | 2/2007 | Han | | H01L 25/167 257/98 |
| 2008/0290352 A1 * | 11/2008 | Park | | H01L 33/60 257/89 |
| 2009/0175042 A1 * | 7/2009 | Chien | | H04N 5/2354 362/311.02 |
| 2009/0290368 A1 | 11/2009 | Iwai et al. | | |
| 2010/0002455 A1 * | 1/2010 | Matsuoka | | H01L 33/60 362/382 |
| 2010/0282951 A1 * | 11/2010 | Costello | | G01D 11/245 250/221 |
| 2010/0316235 A1 * | 12/2010 | Park | | H04R 1/025 381/151 |
| 2011/0182081 A1 | 7/2011 | Oeuvrard et al. | | |
| 2011/0271569 A1 * | 11/2011 | Nelson | | G09F 13/04 40/552 |
| 2012/0035690 A1 * | 2/2012 | Turtzo | | A61F 7/00 607/90 |
| 2012/0057085 A1 * | 3/2012 | Sasaki | | H04N 5/64 348/836 |
| 2012/0068292 A1 * | 3/2012 | Ikeda | | G02B 13/006 257/432 |
| 2012/0182739 A1 * | 7/2012 | Leung | | F21S 2/005 362/249.06 |
| 2012/0199727 A1 * | 8/2012 | Kubota | | G03F 7/105 250/214.1 |
| 2014/0043496 A1 * | 2/2014 | Azuma | | H04N 5/2254 348/208.7 |
| 2014/0043519 A1 * | 2/2014 | Azuma | | G03B 3/10 348/345 |

FOREIGN PATENT DOCUMENTS

| | | |
|---|---|---|
| EP | 1 383 101 A1 | 1/2004 |
| GB | 2460141 A | 11/2009 |
| JP | 62-89682 U | 6/1987 |
| JP | 4-81064 A | 3/1992 |
| JP | 5-36483 U | 5/1993 |
| JP | 6-6394 Y2 | 2/1994 |
| JP | 8-292068 A | 11/1996 |
| JP | 2010-122062 A | 6/2010 |
| WO | 2010/023392 A1 | 3/2010 |

OTHER PUBLICATIONS

Chinese Office Action for the related Chinese Patent Application No. 201380016021.6 dated Mar. 4, 2016.
International Search Report and Written Opinion of the International Search Report for PCT/JP2013/058462 dated Oct. 7, 2013.
Korean Office Action for the related Korean Patent Application No. 10-2014-7026627 dated Aug. 3, 2015.
Chinese Office Action for the related Chinese Patent Application No. 201380016021.6 dated Aug. 31, 2016.

* cited by examiner

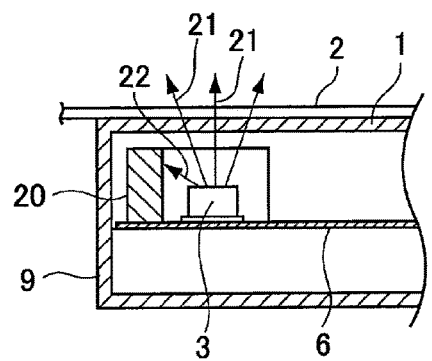
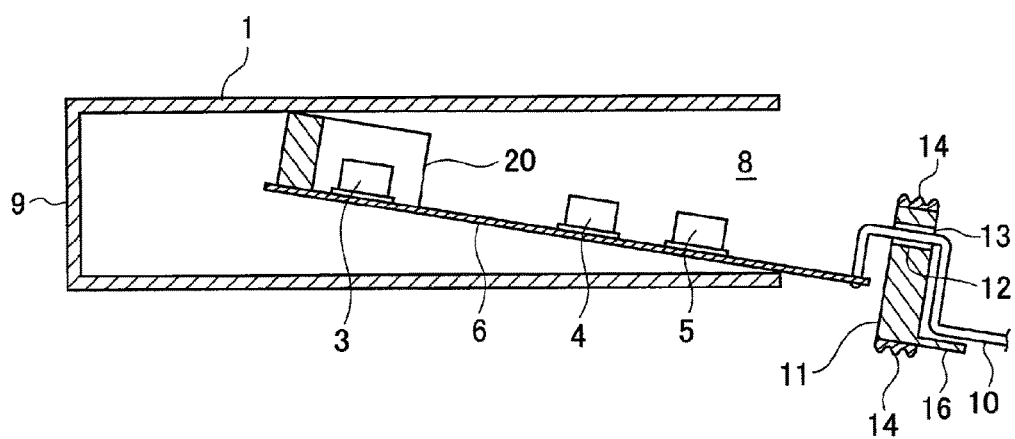

INDICATION APPARATUS

CROSS REFERENCE TO RELATED APPLICATIONS

This application is a continuation of PCT application No. PCT/JP2013/058462, which was filed on Mar. 15, 2013 based on Japanese Patent Application (No. 2012-067274) filed on Mar. 23, 2012, the contents of which are incorporated herein by reference.

BACKGROUND OF THE INVENTION

1. Field of the Invention

The present invention relates to an indication apparatus, and more particularly to an indication apparatus which has a light source for illuminating an indication panel having indicator designs, such as meters, letters, symbols and the like, from a backside thereof.

2. Description of the Related Art

To indicate a variety of information by meters such as a speed meter, letters, symbols or the like, which is provided on a front panel of a vehicle, is illuminated from a backside thereof, an indication apparatus, in which an indication panel having indicator designs for indicating such information is illuminated from a backside thereof to improve visibility, is used. For example, an indication apparatus disclosed in JP-A-2010-122062 includes a wiring board, on which a plurality of LEDs as light sources spaced from each other are mounted, disposed at a backside of an indication panel having transparent indicator designs. A space between the light sources and the indication panel is properly partitioned by a light-shielding housing having a tub shape flared toward an end thereof, so that when a specific LED is turned on, light is illuminated only on the corresponding indicator design and is not leaked toward regions of the other indicator designs.

SUMMARY OF THE INVENTION

However, the indication apparatus disclosed in JP-A-2010-122062 is formed such that the LED is disposed in a smaller diameter opening of the light housing made of a resin, the smaller diameter opening is closed by the wiring board, and a larger diameter opening is closed by the indication panel having indicator designs. Therefore, if the light housing made of a resin is contacted with the LED during assembly, there is a risk of damaging the LED. Also, the LED is disposed in a space closed by the indication panel, the light housing and the wiring board. In a posture in which the indication apparatus is attached on a front panel of a vehicle, the smaller diameter opening of the light housing is disposed downward. As a result, when condensation is occurred in the light housing, there is a risk of adhering water droplets on the LED. In addition, a mold needs to be manufactured to form the light housing, thereby increasing manufacturing costs of the indication apparatus.

Accordingly, an object to be solved by the present invention is to prevent a risk of damaging a light source by a light-shielding wall contacted with the light source during assembly, to prevent a risk of adhering condensed water inside the light-shielding wall on the light source, and also to reduce manufacturing costs of the light-shielding wall.

A first aspect of the present invention provides an indication apparatus, including: a square tub-shaped housing having at least one transparent side surface formed of a transparent member; an indication panel that is disposed on the transparent side surface and includes one or more indicator designs; a wiring board that includes one or more light sources corresponding to the one or more indicator designs and an electric circuit for turning the one or more light sources on/off, wherein the wiring board is inserted and received in the housing through an opening of a tub end of the housing; and a sponge light-shielding wall that is adhered on a surface of the wiring board for surrounding at least a portion of outer circumferential sides of at least one target light source of the one or more light sources.

According to the above configuration, the light-shielding wall is formed of the sponge. As a result, even if the light-shielding wall is contacted with the light source, such as LEDs, during assembly, there is no risk of damaging the light source because the sponge is softer than the light source. Also, the light source is disposed in a space closed by the housing and the wiring board, but moisture inside the space is absorbed by the sponge of the light-shielding wall, thereby preventing a risk of damaging the light source due to the condensed water adhered thereon. In addition, there is no need to manufacture a mold for the light-shielding wall made of the sponge, thereby reducing manufacturing costs of the light-shielding wall.

The indication apparatus may be configured so that the sponge light-shielding wall is opened in at least an upper end side thereof to be conformed to an indication region of the indicator design corresponding to the target light source to be surrounded, the sponge light-shielding wall having a height higher than that of the target light source. In addition, a holder may be further provided in the opening of the housing to hold an externally-drawn wire connected to the wiring board. In this case, the holder can be preferably air-tightly mounted in the housing. Thus, penetration of moisture into the housing can be inhibited.

Also, the indication apparatus may be configured so that a tub end opposite to the opening of the housing is closed, and thereby whole of the housing is formed of the transparent member, and the sponge light-shielding wall is formed to surround three sides including at least a closed end side of the housing, among the outer circumferential sides of the target light source adjacent to the closed end. Therefore, a leakage of light from the closed end of the housing can be prevented.

According to the present invention, there is no risk of damaging a light source by a light-shielding wall contacted with the light source during assembly and of adhering condensed water inside the light-shielding wall on the light source, and also manufacturing costs of the light-shielding wall can be reduced.

BRIEF DESCRIPTION OF THE DRAWINGS

In the accompanying drawings:

FIG. 3 is a diagram explaining an illuminating state of a LED of FIG. 1; and

FIG. 4 is a diagram explaining a state in which a wiring board having the LED mounted thereon is being inserted in and assembled to a housing.

DETAILED DESCRIPTION OF THE EXEMPLARY EMBODIMENTS

Figure 1:
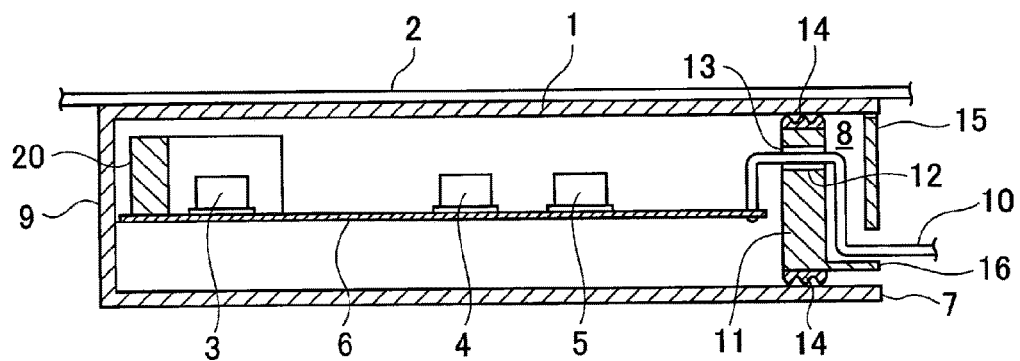
FIG. 1 is a sectional view showing an indication apparatus according to one embodiment of the present invention.
Figure 2:
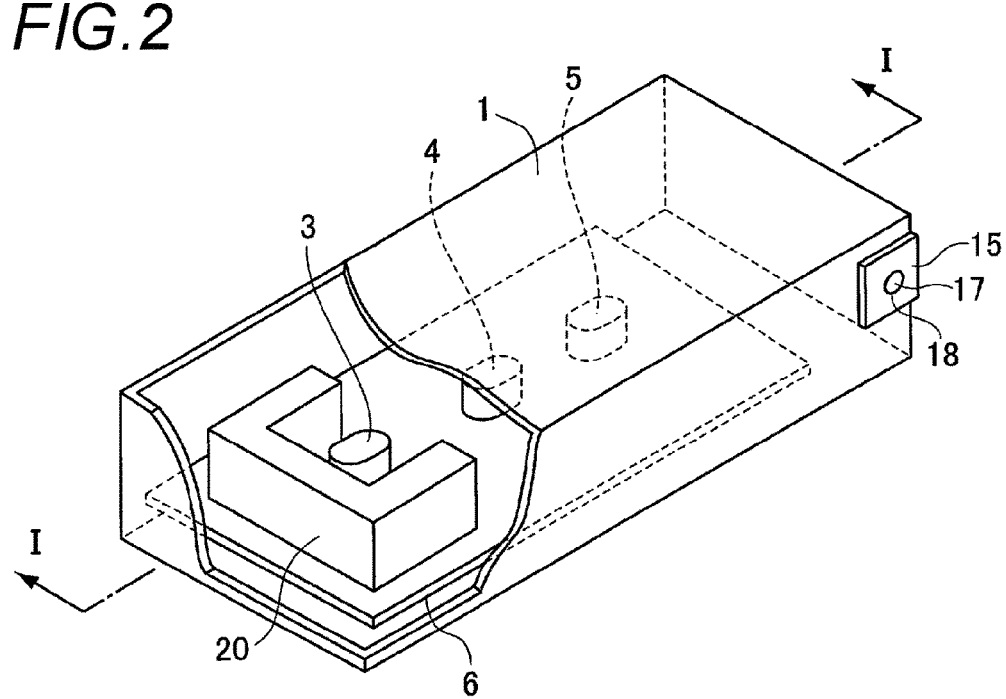
FIG. 2 is an exterior perspective view showing the embodiment of FIG. 1 with a portion thereof cut out.

An indication apparatus according to an embodiment of the present invention will be now described. FIG. 1 is a sectional view showing an indication apparatus according to the embodiment the present invention, and FIG. 2 is an exterior perspective view showing the present embodiment with a portion thereof cut out. Herein, FIG. 1 is a sectional view taken along an arrow I-I of FIG. 2. The present embodiment will be described with respect to an indication apparatus used in an instrument panel mounted on a front panel of a vehicle. However, the present invention is not limited to the present embodiment, but can be applied to an indication apparatus in which an indication panel having indicator designs for indicating a variety of information by meters, letters, symbols or the like is illuminated from a backside thereof to improve visibility.

As shown in FIGS. 1 and 2, an indication apparatus according to the present embodiment includes a square tub-shaped housing 1 formed of a transparent member, an indication panel 2 disposed on one side surface (e.g., an upper side surface in the figures) of the housing 1 and having indicator designs, and a wiring board 6 having a plurality of LEDs (Light Emitting Diodes) 3, 4 and 5 mounted thereon for illuminating the respective indicator designs from a backside thereof. The wiring board 6 is provided with an electric circuit for turning the LEDs 3, 4 and 5 on/off. In FIG. 2, to avoid complexity of the figure, the indication panel 2 and externally-drawn wires, a holder or the like as described below are omitted.

In the present embodiment, the housing 1 is described as an example in which the whole thereof is formed of a transparent member, such as a transparent resin, but the invention is not limited to this configuration. That is, at least one side thereof located at the backside of the indication panel 2 may be formed of a transparent member. One tub end 7 of the square-tub shaped housing 1 is formed as an opening 8 and the other tub end 9 is formed of the same transparent member as that of the housing 1 and integrally closed. In addition, it is needless to say that the indication panel 2 can have one more indicator designs depending on applications thereof, and correspondingly one or more LEDs as light sources can be provided.

The wiring board 6 is inserted and received in the housing 1 through the opening of the tub end 7 of the housing 1 and then held inside the housing 1 by a support member (not shown). The electric circuit of the wiring board 6 is connected with a plurality of externally-drawn wires 10, thereby being connected to an outside power supply (not shown) or the like. The externally-drawn wires 10 are drawn to the outside through a through-hole 12 formed in a holder 11 mounted in the opening 8 of the housing 1. In addition, the externally-drawn wires 10 are sealed with a rubber stopper 13 mounted in the through-hole 12. The holder 11 is formed in a rectangular shape by a resin or the like, and has a packing 14 mounted on an outer circumference thereof. In this way, the holder 11 is air-tightly mounted on an inner circumferential surface of the opening 8 of the housing 1, thereby preventing moisture from being penetrated into the housing 1.

Also, an upper side of the opening 8 of the tub end 7 is covered with a cover 15. As shown in FIG. 2, the cover 15 is fixed by engaging holes 18 on both ends thereof bent along side surfaces of the housing 1 with cylindrical protrusions 17 protruding from the side surfaces of the housing 1. Thereby, the externally-drawn wires 10 drawn through the through-hole 12 of the holder 11 are bent in a hook shape and then drawn to the outside through an opening below the cover 15, thereby forming a so-called strain relief structure. Thus, even if an external force is exerted to the externally-drawn wires 10 in a direction in which the externally-drawn wires 10 are drawn from the housing 1, the bent portions of the externally-drawn wires 10 is abutted with the cover 15 to inhibit the externally-drawn wires 10 from being pulled out, thereby preventing connection portions between the wiring board 6 and the externally-drawn wires 10 from being broken off by the external force. In addition, the holder 11 is provided on a lower end thereof with a member 16 protruding toward a side of the opening 8 below the cover 15. The member 16 is a portion provided to be pinched by fingers when the holder 11 is inserted into the opening 8 of the housing 1 so that a position of the holder 11 can be easily adjusted. Also, the member 16 is cooperated with the cover 15 to bend the externally-drawn wires 10, thereby forming a strain relief structure.

Next, a light-shielding wall 20 will be described. The light-shielding wall 20 is formed of a sponge and adhered on a mounting surface in the wiring board 6 by an adhesive material or the like. The light-shielding wall 20 according to the present embodiment is formed in a U-shape surrounding the LED 3 to block lights illuminated from a side facing the tub end 9 of the housing 1 and sides facing both side surfaces of the housing 1 among outer circumferential sides of the LED 3. A wall surface of the light-shielding wall 20 facing the LED 4 is opened and an upper end of the light-shielding wall 20 is also opened. In addition, the light-shielding wall 20 is formed to have a height higher than a height of the LED 3. In this way, as shown in FIG. 3, a light 21 from the LED 3 is illuminated on a region of the indication panel 2 in which the corresponding indicator design is provided, but a light 22 which would otherwise reach the tub end 9 of the housing 1 is blocked by the light-shielding wall 20. As a result, a problem caused by a light leaked from the tub end 9 of the housing 1 to the outside can be prevented. In addition, a material for the sponge is not limited if the material is a porous and soft material having countless small holes formed therein. Accordingly, a synthetic sponge produced by foam-molding a synthetic resin, such as a polyurethane, having a property of absorbing a liquid can be used.

Although an example in which the light-shielding wall 20 is provided to surround portions of the outer circumferential sides of the LED 3 is described in the present embodiment, the present invention is not limited to this configuration. Namely, the light-shielding wall 20 may be provided to surround all of the outer circumferential sides of the LED 3. Also, if necessary, the light-shielding wall may be provided to also surround other LEDs 4 and 5. In other words, the light-shielding wall 20 made of the sponge is opened in at least an upper end thereof to be conformed to an indication region of an indicator design corresponding to a target LED to be surrounded, and is formed of a wall higher than a height of the LED. In addition, although walls of the light-shielding wall 20 are formed to be perpendicular to the wiring board 6 in the present embodiment, the invention is not limited to this configuration. Namely, the light-shielding wall 20 may be formed in a cylindrical or half-cylindrical shape enlarged toward the indication panel 2.

According to the present embodiment, because the light-shielding wall 20 is formed of the sponge, even if the light-shielding wall 20 is hit against an inner surface of the housing 1 when the whole of the wiring board 6 is inserted into the housing 1 through the opening 8 thereof during assembly as shown in FIG. 4, the light-shielding wall 20 can be deformed to absorb the impact, thereby preventing damages of components on the wiring board 6. Also, even if the light-shielding wall 20 is so deformed to be hit against the LED 3, there is no risk of damaging the LED 3 because the sponge is softer than the LED 3. Further, the LED 3 is disposed in a space closed by the housing 1 and the wiring board 6, but moisture inside the space is absorbed by the sponge of the light-shielding wall 20, thereby preventing a risk of damaging the LEDs 3, 4 and 5 due to the condensed water adhered thereon. In addition, there is no need to manufacture a mold for the light-shielding wall 20 made of the sponge, thereby reducing manufacturing costs of the light-shielding wall 20.

The indication apparatus according to the present invention prevents a risk of damaging a light source by a light-shielding wall contacted with the light source during assembly, to prevent a risk of adhering condensed water inside the light-shielding wall on the light source, and also to reduce manufacturing costs of the light-shielding wall.

What is claimed is:

1. An indication apparatus, comprising:
   a square tub-shaped housing having at least one transparent side surface formed of a transparent member;
   an indication panel that is disposed on the transparent side surface and includes one or more indicator designs;
   a wiring board that includes one or more light sources corresponding to the one or more indicator designs and an electric circuit for turning the one or more light sources on/off, wherein the wiring board is inserted and received in the housing through an opening of a tub end of the housing; and
   a sponge light-shielding wall that is adhered on a surface of the wiring board for surrounding at least a portion of outer circumferential sides of at least one target light source of the one or more light sources, the sponge light-shielding material is configured to absorb contact with the housing such that damage to the at least one target light source is reduced.

2. The indication apparatus according to claim 1, wherein the sponge light-shielding wall is opened in at least an upper end side thereof to be conformed to an indication region of the indicator design corresponding to the target light source to be surrounded, the sponge light-shielding wall having a height higher than that of the target light source.

3. The indication apparatus according to claim 1, wherein a holder is further provided in the opening of the housing to hold an externally-drawn wire connected to the wiring board.

4. The indication apparatus according to claim 1, wherein a tub end opposite to the opening of the housing is closed, and thereby whole of the housing is formed of the transparent member, and
   the sponge light-shielding wall is formed to surround three sides including at least a closed end side of the housing, among the outer circumferential sides of the target light source adjacent to the closed end.

5. The indication apparatus according to claim 1, wherein the sponge light-shielding wall is spaced apart from the outer circumferential sides of the target light source.

6. The indication apparatus according to claim 1, wherein the sponge light-shielding wall is spaced apart from each of the one or more light sources.

7. The indication apparatus according to claim 1, wherein the wiring board has a first end adjacent the opening in the tub end of the housing and a second end opposite to the first end, and
   the sponge light-shielding wall is adhered on the surface of the wiring board at a location adjacent to the second end.

* * * * *